United States Patent
Zhang et al.

(10) Patent No.: US 10,769,499 B2
(45) Date of Patent: Sep. 8, 2020

(54) METHOD AND APPARATUS FOR TRAINING FACE RECOGNITION MODEL

(71) Applicant: FUJITSU LIMITED, Kawasaki-shi, Kanagawa (JP)

(72) Inventors: Meng Zhang, Beijing (CN); Rujie Liu, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 16/179,292

(22) Filed: Nov. 2, 2018

(65) Prior Publication Data
US 2019/0138854 A1    May 9, 2019

(30) Foreign Application Priority Data
Nov. 3, 2017    (CN) .......................... 2017 1 1070481

(51) Int. Cl.
*G06K 9/62* (2006.01)
*G06K 9/00* (2006.01)

(52) U.S. Cl.
CPC ....... *G06K 9/6262* (2013.01); *G06K 9/00281* (2013.01); *G06K 9/00288* (2013.01); *G06K 9/6256* (2013.01)

(58) Field of Classification Search
None
See application file for complete search history.

(56) References Cited

U.S. PATENT DOCUMENTS

| 2012/0308121 A1* | 12/2012 | Datta ................. G06F 16/5838 382/155 |
| 2019/0050632 A1* | 2/2019 | Weng ................... G06N 3/0454 |
| 2019/0114467 A1* | 4/2019 | Liang ................. G06K 9/00234 |

FOREIGN PATENT DOCUMENTS

| CN | 101162502 A | * | 4/2008 |
| CN | 106570447 A | * | 4/2017 |
| CN | 107845062 A | * | 3/2018 |

* cited by examiner

*Primary Examiner* — Fan Zhang
(74) *Attorney, Agent, or Firm* — Staas & Halsey LLP (57) ABSTRACT

A method and apparatus for removing black eyepits and sunglasses in first actual scenario data having an image containing a face acquired from an actual scenario, to obtain second actual scenario data; counting a proportion of wearing glasses in the second actual scenario data; dividing original training data composed of an image containing a face into wearing-glasses and not-wearing-glasses first and second training data, where a proportion of wearing glasses in the original training data is lower than a proportion in the second actual scenario data; generating wearing-glasses third training data based on glasses data and the second training data; generating fourth training data in which a proportion of wearing glasses is equal to the proportion of wearing glasses in the second actual scenario data, based on the third training data and the original training data; and training a face recognition model based on the fourth training data.

15 Claims, 4 Drawing Sheets

METHOD AND APPARATUS FOR TRAINING FACE RECOGNITION MODEL

CROSS-REFERENCE TO RELATED APPLICATIONS

This application claims priority to Chinese Patent Application No. 201711070481.3 filed on Nov. 3, 2017 and entitled "Method and Apparatus for Training Face Recognition Model," the disclosure of which is incorporated herein by reference herein in its entirety.

BACKGROUND

1. Field

The present embodiments relate generally to the field of information processing technology. In particular, the present embodiments relate to a method and apparatus capable of training a face recognition model with training data coinciding with a proportion of wearing glasses in an actual scenario.

2. Description of the Related Art

In recent years, with the development of information technology, there have been more and more systems and applications based on human face recognition, which benefits from a large amount of training data and convolutional neural networks CNNs. However, there exists a great challenge for performing human face recognition for a wearing-glasses human face image. The main reason lies in lack of wearing-glasses human face images for the training of a human face recognition model. At present, there exist open human face databases, such as WebFace and MS-Celeb-1M databases. However, these databases mainly include image data of famous persons, whereas the famous persons generally seldom wear glasses. Therefore, proportions of wearing glasses in these databases are lower than proportions of wearing glasses in the conventional crowds. In addition, most of the glasses worn by the famous persons are sunglasses, which are different from near-sighted glasses generally worn in the conventional crowds. It is obviously manpower-consuming and resource-consuming to collect a large amount of wearing-glasses human face data.

To solve the foregoing problem, the present embodiments propose a method for generating a wearing-glasses image, such that a proportion of wearing glasses in a training image coincides with a proportion of wearing glasses in an actual scenario, thereby being advantageous to train a face recognition model.

Therefore, the present embodiments are intended to provide a method and apparatus capable of training a face recognition model with training data coinciding with a proportion of wearing glasses in an actual scenario.

SUMMARY

Additional aspects and/or advantages will be set forth in part in the description which follows and, in part, will be apparent from the description, or may be learned by practice of the embodiments.

A brief summary of the present embodiments is given below to provide a basic understanding of some aspects of the present embodiments. It should be understood that the summary is not exhaustive; and it does not intend to define a key or important part of the present embodiments, and it does not intend to limit the scope of the present embodiments. The object of the summary is only to briefly present some concepts, which serves as a preamble of the detailed description that follows.

An object of the present embodiments is to propose a method and apparatus for training a face recognition model with training data coinciding with a proportion of wearing glasses in an actual scenario.

To achieve the foregoing object, according to an aspect of the present embodiments, there is provided a method for training a face recognition model, comprising: removing black eyepits and sunglasses in first actual scenario data composed of an image containing a face which is acquired from an actual scenario, to obtain second actual scenario data; counting a proportion of wearing glasses in the second actual scenario data; dividing original training data composed of an image containing a face into wearing-glasses first training data and not-wearing-glasses second training data, wherein a proportion of wearing glasses in the original training data is lower than a proportion of wearing glasses in the second actual scenario data; generating wearing-glasses third training data based on glasses data and the second training data; generating fourth training data in which a proportion of wearing glasses is equal to the proportion of wearing glasses in the second actual scenario data, based on the third training data and the original training data; and training the face recognition model based on the fourth training data.

According to another aspect of the present embodiments, there is provided an apparatus for training a face recognition model, comprising: a removing device configured to: remove black eyepits and sunglasses in first actual scenario data composed of an image containing a face which is acquired from an actual scenario, to obtain second actual scenario data; a counting device configured to: count a proportion of wearing glasses in the second actual scenario data; a dividing device configured to: divide original training data composed of an image containing a face into wearing-glasses first training data and not-wearing-glasses second training data, wherein a proportion of wearing glasses in the original training data is lower than a proportion of wearing glasses in the second actual scenario data; an adding glasses device configured to: generate wearing-glasses third training data based on glasses data and the second training data; a proportion adjusting device configured to: generate fourth training data in which a proportion of wearing glasses is equal to the proportion of wearing glasses in the second actual scenario data, based on the third training data and the original training data; and a model training device configured to: train the face recognition model based on the fourth training data.

In addition, according to another aspect of the present embodiments, there is further provided a storage medium. The storage medium comprises machine readable program codes that, when executed on an information processing apparatus, cause the information processing apparatus to implement the foregoing method according to the present embodiments.

Moreover, according to yet another aspect of the present embodiments, there is further provided a program product. The program product comprises machine executable instructions that, when executed on an information processing apparatus, cause the information processing apparatus to implement the foregoing method according to the present embodiments.

BRIEF DESCRIPTION OF THE DRAWINGS

The foregoing and other objects, features and advantages of the present embodiments will be understood more easily with reference to the description of embodiments given in conjunction with the drawings hereinafter. The components in the drawings aim only to show the principle of the present embodiments. The same or similar technical features or components will be denoted with the same or similar reference signs throughout the drawings. In the drawings.

DETAILED DESCRIPTION

Exemplary embodiments will be described in detail in combination with the drawings hereinafter. For the sake of clarity and conciseness, the description does not describe all features of actual embodiments. However, it should be understood that in developing any such actual embodiment, many decisions specific to the embodiments must be made, so as to achieve specific objects of a developer; for example, those limitation conditions related to system and services are met, and these limitation conditions possibly will vary as embodiments are different. In addition, it should be appreciated that although developing tasks are possibly complicated and time-consuming, such developing tasks are only routine tasks for those skilled in the art benefiting from the present disclosure.

It should also be noted herein that, to avoid the present embodiments from being obscured due to unnecessary details, only those device structures and/or processing steps closely related to the solution according to the present embodiments are shown in the drawings, while omitting other details not closely related to the present embodiments. In addition, it should also be noted that, elements and features described in one figure or one embodiment may be combined with elements and features shown in one or more other figures or embodiments.

The flow of a method for training a face recognition model according to an embodiment will be described with reference to FIG. 1 below.

Figure 1:
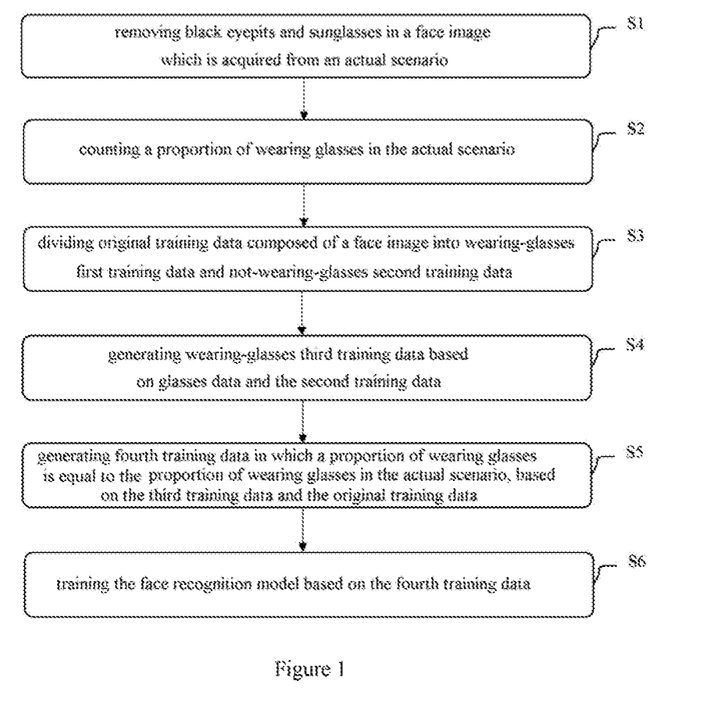
FIG. 1 shows a flow chart of a method for training a face recognition model according to an embodiment.

FIG. 1 shows a flow chart of a method for training a face recognition model according to an embodiment. As shown in FIG. 1, the method comprises the steps of: removing black eyepits and sunglasses in first actual scenario data composed of an image containing a face which is acquired from an actual scenario, to obtain second actual scenario data (step S1); counting a proportion of wearing glasses in the second actual scenario data (step S2); dividing original training data composed of an image containing a face into wearing-glasses first training data and not-wearing-glasses second training data, wherein a proportion of wearing glasses in the original training data is lower than a proportion of wearing glasses in the second actual scenario data (step S3); generating wearing-glasses third training data based on glasses data and the second training data (step S4); generating fourth training data in which a proportion of wearing glasses is equal to the proportion of wearing glasses in the second actual scenario data, based on the third training data and the original training data (step S5); and training the face recognition model based on the fourth training data (step S6).

The training of the face recognition model has great influences on recognition precision and accuracy rate. The training of the face recognition model also depends mainly on training data. As mentioned previously, the main reason why it is difficult for the existing face recognition models to recognize a wearing-glasses human face image lies in lack of a large amount of wearing-glasses training data. Actually, proportions of wearing glasses are different in different actual application scenarios. For example, a clocking-in machine in each company is applied mainly to the staff in specific companies, proportions of wearing glasses in different companies are different, and proportions of wearing glasses in primary schools, college campuses and hospitals are also inconsistent in each case. It is desired to, with respect to an actual scenario of each application, generate training data in which a proportion of wearing glasses is the same as a proportion of wearing glasses in the actual scenario to train a face recognition model, thereby improving an accuracy rate of recognition of the face recognition model in the actual scenario.

Therefore, it is first necessary to acquire a proportion of wearing glasses in an actual scenario of a specific application.

An image containing a face is acquired from an actual scenario of a specific application, to constitute first actual scenario data.

In comparison with the generally adopted manner of directly judging whether image data is wearing glasses, the present embodiments perform pre-processing, so as to improve the accuracy of judgment.

Black eyepits and sunglasses have relatively strong interference effects on judging whether image data is wearing glasses; therefore, in step S1, black eyepits and sunglasses in first actual scenario data are removed to obtain second actual scenario data. It is more accurate to perform the judgment as to wearing glasses using the second actual scenario data.

In step S2, a proportion of wearing glasses in the second actual scenario data is counted.

For example, it is possible to judge, using a classifier or convolutional neural network having been trained, whether an image containing a face in the second actual scenario data is wearing glasses, and to perform counting, so as to acquire a proportion of wearing glasses in the second actual scenario data, as a proportion of wearing glasses in an actual scenario of a specific application. This is the goal of adjusting a proportion of wearing glasses in the present embodiments. Training data of the classifier or convolutional neural network is for example marked training data composed of an image containing a face, in which whether the data is wearing glasses has been marked.

In step S3, the original training data composed of an image containing a face is divided into wearing-glasses first training data and not-wearing-glasses second training data, wherein a proportion of wearing glasses in the original training data is lower than a proportion of wearing glasses in the second actual scenario data.

The original training data is for example acquired from Internet, and as stated previously, for example acquired from WebFace and MS-Celeb-1M databases, and may also be collected manually. Since the proportion of wearing glasses in the original training data is generally lower than the proportion of wearing glasses in the second actual scenario data, it is necessary to adjust the proportion of wearing glasses in the original training data to be the same as the proportion of wearing glasses in the second actual scenario data by increasing the number of wearing-glasses images.

It is necessary to first divide the original training data into wearing-glasses first training data and not-wearing-glasses second training data, and then increase the amount of wearing-glasses data by adding glasses to the second training data.

Figure 2:
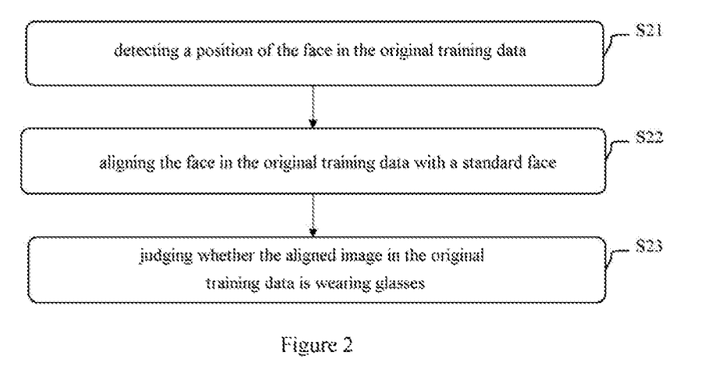
FIG. 2 shows a flow chart of a method for dividing an image containing a face in original training data according to whether the image is wearing glasses.

To accurately judge whether the image containing a face in the original training data is wearing glasses, as shown in FIG. 2, in step S21, a position of the face in the original training data is detected. Human face detection is a basis for human face recognition, and step S21 may be implemented adopting the prior art.

In step S22, the face in the original training data is aligned with a standard face. The standard face is a standard template of a human face, and positions of eyes and mouth corners in the standard face are fixed. By aligning the face detected in step S21 with the standard face, it is made possible to improve an accuracy rate of judging whether the aligned face is wearing glasses. The alignment technology is the existing technology in the field of image processing.

In step S23, it is judged, using a classifier or convolutional neural network having been trained (which is for example the convolutional neural network or classifier used in the foregoing step S2), whether the aligned face in the original training data is wearing glasses, thereby dividing the original training data into wearing-glasses first training data and not-wearing-glasses second training data.

Since the position of the face has been detected and the face has been aligned with the standard face, the accuracy of the judgment as to whether the image in the original training data is wearing glasses is relatively high.

It is necessary to add the amount of wearing-glasses data below, and the basis for the adding is the not-wearing-glasses second training data.

In step S4, wearing-glasses third training data is generated based on glasses data and the second training data.

Glasses data is data prepared in advance, and includes various types of glasses such as plain glasses, near-sighted glasses, farsighted glasses and sunglasses, different frame and lens shapes, frame thicknesses, lens colors and the like. The glasses data comprises keypoint information, glasses images, and lens information of each type of glasses. The keypoint information is sufficient to represent a shape and a structure of the glasses, the glasses images are contents superimposed when adding the glasses, and the lens information identifies a boundary between lenses and a frame. Existing glasses may be segmented into a frame and lenses by a segmentation algorithm, thereby acquiring the lens information.

Figure 3:
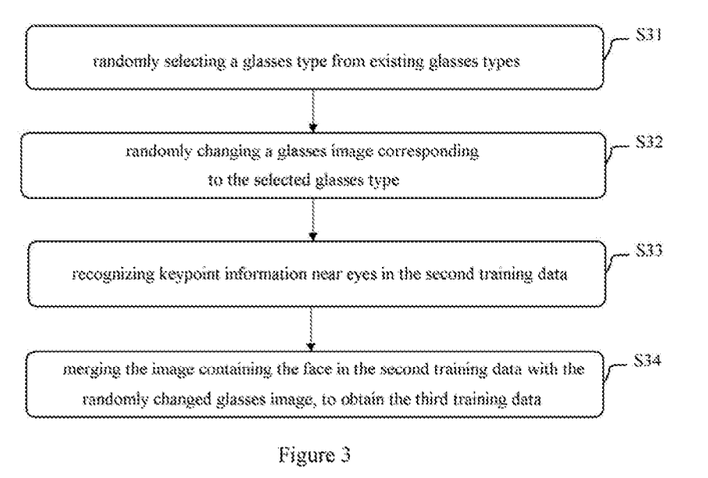
FIG. 3 shows a method for generating wearing-glasses third training data.

As shown in FIG. 3, the method for generating wearing-glasses third training data comprises: randomly selecting a glasses type from existing glasses types (step S31); randomly changing a glasses image corresponding to the selected glasses type (step S32); recognizing keypoint information near eyes in the second training data (step S33); merging the image containing the face in the second training data with the randomly changed glasses image using affine transformation, based on keypoint information corresponding to the randomly changed glasses image and the recognized keypoint information near the eyes, to obtain the third training data (step S34).

In step S31, a glasses type is randomly selected from existing glasses types. That is, one type of glasses data, such as near-sighted glasses, certain frame and lens shapes, a certain frame thickness, a certain lens color and the like, is selected; corresponding keypoint information can represent a shape and a structure of the glasses, for merging; a corresponding glass image reflects frame and lens shapes, a frame thickness, a lens color and the like; and lens information identifies a boundary between lenses and a frame, for subsequent zooming processing with respect to near-sighted glasses.

In step S32, a glasses image corresponding to the selected glasses type is randomly changed.

The amount of data included in the existing glasses types in databases is very limited. However, the kinds of permutations and combinations of various aspects of the glasses data are diverse. Therefore, the kinds of the glasses may be enriched by randomly changing a glasses image corresponding to the selected glasses type, thereby being advantageous to better train a face recognition module.

Specifically, a glasses frame in the glasses image may be substituted. The glasses frame is limited to an existing type of glasses frames, including a specific shape, thickness, color and the like. Moreover, a thickness of the glasses frame may be randomly changed, that is, the glasses frame is thickened or made thinner within a predetermined reasonable range. In addition, a shape of the glasses frame may be randomly changed, that is, only the shape of the glasses frame is changed while maintaining the existing thickness and color of the glasses frame. Of course, a color of glasses lenses may also be randomly changed. The color is not limited to colors of the existing lenses in the databases, but may be various colors recognizable by human eyes.

In step S33, keypoint information near eyes in the second training data is recognized. Facial Landmark Detection Algorithm can detect 68 face keypoints. By using about 9 keypoint data near the eyes, it is made possible to help with adding glasses to an appropriate position.

In step S34, the image containing the face in the second training data is merged with the randomly changed glasses image using affine transformation, based on keypoint information corresponding to the randomly changed glasses image and the recognized keypoint information near the eyes, to obtain the third training data.

By using the keypoint information of the glasses image and the keypoint information near the eyes, it is made possible to merge the face image in the second training data with the glasses image obtained through random selection and random changing, so as to achieve an effect of adding glasses. The affine transformation is a technology well-known to those skilled in the art, and will not be redundantly described herein.

Particularly, when the selected glasses is near-sighted glasses, since the near-sighted lenses is concave lenses and will make the eyes appear to become smaller, the following special processing is adopted to zoom out the sizes of the eyes in the face image in the second training data.

Figure 4:
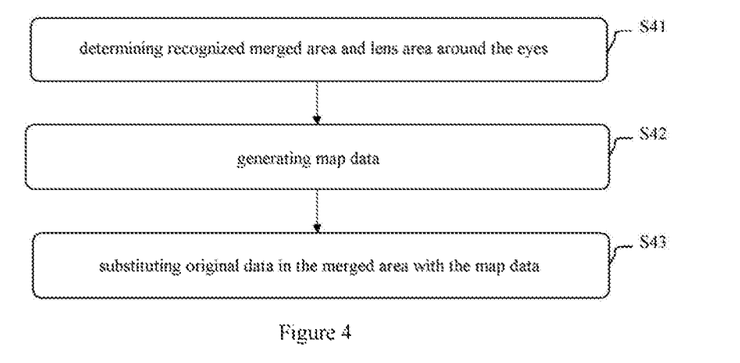
FIG. 4 shows a merging method for making eyes become smaller.

Specifically, as shown in FIG. 4, first, in step S41, the recognized merged area and lens area around the eyes are determined using affine transformation, based on keypoint information and lens information corresponding to the randomly changed glasses image as well as the recognized keypoint information near the eyes. The merged area is an area to be merged with the glasses image, and the lens area is an area to be merged with an area where the lenses in the glasses image lie, i.e., an area in the merged area which corresponds to the lenses.

In step S42, an original image around the eyes and larger than the lens area is extracted from the face image in the second training data, this part of original image is zoomed to have a same size as the lens area, and then a zooming result is superimposed with the randomly changed glasses image, and a superimposing result is called map data.

In step S43, original data in the merged area in the face image in the second training data is substituted with the map data.

Since the original image part in the map data includes eyes and has been zoomed out with respect to the original data in the face image in the second training data, it can achieve an effect of making the eyes become smaller.

In this way, in step S4, wearing-glasses third training data is generated. In the presence of the wearing-glasses third training data, a proportion of wearing glasses in the original training data can be increased, such that a proportion of wearing glasses in the training data which is ultimately obtained is consistent with the proportion of wearing glass in the actual application scenario.

In step S5, fourth training data in which a proportion of wearing glasses is equal to the proportion of wearing glasses in the second actual scenario data is generated based on the third training data and the original training data.

For example, an appropriate amount of data may be randomly selected from the third training data, and added to the original training data, until a proportion of wearing glasses in fourth training data obtained after the adding is equal to the proportion of wearing glasses in the second actual scenario data.

The proportion of wearing glasses in the fourth training data obtained according to the method of the present embodiments satisfies the actual application scenario, and the kinds of glasses are diverse.

In step S6, the face recognition model is trained based on the fourth training data.

Since the proportion of wearing glasses in the fourth training data coincides with the proportion of wearing glasses in the actual application scenario, a training effect of the face recognition model is excellent, and an accuracy rate of recognition of the trained face recognition model is high.

An apparatus for training a face recognition model according to an embodiment will be described with reference to FIG. 5 below.

Figure 5:
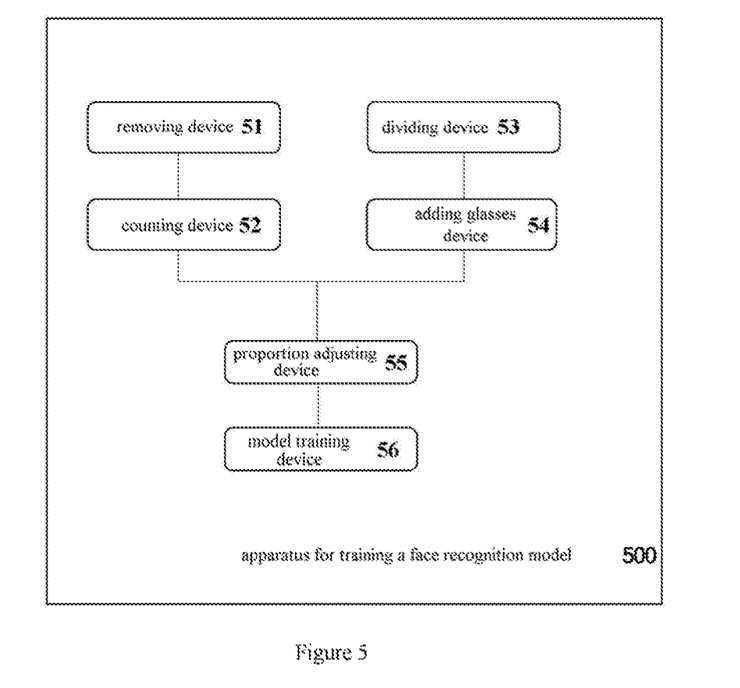
FIG. 5 shows a structural block diagram of an apparatus for training a face recognition model according to an embodiment.

FIG. 5 shows a structural block diagram of an apparatus for training a face recognition model according to an embodiment. As shown in FIG. 5, an apparatus 500 for training a face recognition model according to the present embodiments comprises: a removing device 51 configured to: remove black eyepits and sunglasses in first actual scenario data composed of an image containing a face which is acquired from an actual scenario, to obtain second actual scenario data; a counting device 52 configured to: count a proportion of wearing glasses in the second actual scenario data; a dividing device 53 configured to: divide original training data composed of an image containing a face into wearing-glasses first training data and not-wearing-glasses second training data, wherein a proportion of wearing glasses in the original training data is lower than a proportion of wearing glasses in the second actual scenario data; an adding glasses device 54 configured to: generate wearing-glasses third training data based on glasses data and the second training data; a proportion adjusting device 55 configured to: generate fourth training data in which a proportion of wearing glasses is equal to the proportion of wearing glasses in the second actual scenario data, based on the third training data and the original training data; and a model training device 56 configured to: train the face recognition model based on the fourth training data.

In one embodiment, the dividing device 53 comprises: a detecting unit configured to detect a position of the face in the original training data; an aligning unit configured to align the face in the original training data with a standard face; a deep convolutional neural network or classifier for judging whether the aligned face in the original training data is wearing glasses, to divide the original training data into the first training data and the second training data.

In one embodiment, the glasses data comprises keypoint information, glasses images, and lens information of various types of glasses, the keypoint information representing a shape and a structure of the glasses, the lens information identifying a boundary between lenses and a frame.

In one embodiment, the adding glasses device 54 comprises: a type selecting unit configured to randomly select a glasses type from existing glasses types; an image changing unit configured to randomly change a glasses image corresponding to the selected glasses type; a recognizing unit configured to recognize keypoint information near eyes in the second training data; a merging unit configured to merge the image containing the face in the second training data with the randomly changed glasses image using affine transformation, based on keypoint information corresponding to the randomly changed glasses image and the recognized keypoint information near the eyes, to obtain the third training data.

In one embodiment, the image changing unit is further configured to perform at least one of the operations of: randomly selecting a glasses frame of an existing type to substitute a glasses frame in the glasses image; randomly changing a thickness of the glasses frame; randomly changing a shape of the glasses frame; and randomly changing a color of glasses lenses.

In one embodiment, in a case where the selected glasses type is near-sighted glasses, the merging unit is further configured to: determine the recognized merged area and lens area around the eyes using affine transformation, based on keypoint information and lens information corresponding to the randomly changed glasses image as well as the recognized keypoint information near the eyes; extract, from the image containing the face in the second training data, an area in the image which is around the eyes and larger than the lens area, and zoom it to have a same size as the lens area, and superimpose a zooming result with the randomly changed glasses image, to obtain map data; and substitute original data in the merged area with the map data.

In one embodiment, the original training data is acquired from Internet or collected manually.

Since the processing included in the apparatus 500 according to the present embodiments are similar to the processing in the respective steps comprised in the method described above, detailed description of these processing is omitted here for the sake of conciseness.

Figure 6:
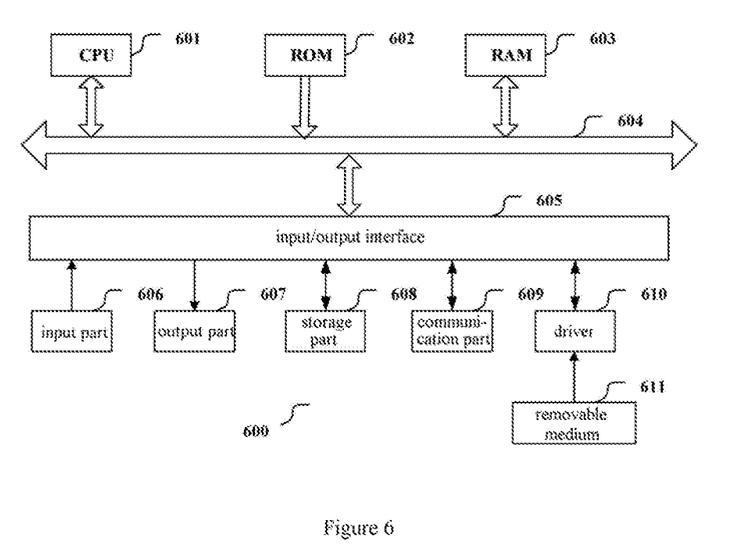
FIG. 6 shows a schematic block diagram of a computer that can be used for implementing the method and the apparatus according to the embodiments.

In addition, it should also be noted herein that, the respective constituent devices and units in the above apparatus may be configured through software, firmware, hardware or a combination thereof. The specific means or manner that can be used for the configuration are well-known to those skilled in the art, and will not be repeatedly described herein. In a case where the configuration is implemented through software or firmware, programs constituting the software are installed from a storage medium or a network to a computer having a dedicated hardware structure (e.g. the universal computer 600 as shown in FIG. 6). The computer, when installed with various programs, is capable of implementing various functions and the like.

FIG. 6 shows a schematic block diagram of a computer that can be used for implementing the method and the apparatus according to the embodiments.

In FIG. 6, a central processing unit (CPU) 601 performs various processes according to programs stored in a read-only memory (ROM) 602 or programs loaded from a storage part 608 to a random access memory (RAM) 603. In the RAM 603, data needed when the CPU 601 performs various processes and the like is also stored, as needed. The CPU 601, the ROM 602 and the RAM 603 are connected to each other via a bus 604. An input/output interface 605 is also connected to the bus 604.

The following components are connected to the input/output interface 605: an input part 606 (including keyboard, mouse and the like), an output part 607 (including display such as cathode ray tube (CRT), liquid crystal display (LCD) and the like, and loudspeaker and the like), a storage part 608 (including hard disc and the like), and a communication part 609 (including network interface card such as LAN card, modem and the like). The communication part 609 performs communication processing via a network such as the Internet. A driver 610 may also be connected to the input/output interface 605, as needed. As needed, a removable medium 611, such as a magnetic disc, an optical disc, a magnetic optical disc, a semiconductor memory and the like, may be installed in the driver 610, such that a computer program read therefrom is installed in the storage part 608 as needed.

In the case where the foregoing series of processing is implemented through software, programs constituting the software are installed from a network such as the Internet or a memory medium such as the removable medium 611.

Those skilled in the art should understand that, such a memory medium is not limited to the removable mediums 611 as shown in FIG. 6 in which programs are stored and which are distributed separately from the apparatus to provide the programs to users. Examples of the removable medium 611 include a magnetic disc (including floppy disc (registered trademark)), a compact disc (including compact disc read-only memory (CD-ROM) and digital video disk (DVD)), a magnetic optical disc (including mini disc (MD) (registered trademark)), and a semiconductor memory. Alternatively, the memory mediums may be hard discs included in the ROM 602 and the storage part 608, and the like, in which programs are stored and which are distributed together with the apparatus containing them to users.

The present embodiments further provide a program product having machine readable instruction codes stored thereon. The instruction codes, when read and executed by a machine, can implement the foregoing methods according to the embodiments.

Accordingly, a non-transitory computer readable storage medium for carrying the foregoing program product having computer readable instruction codes stored thereon is also included in the present embodiments. The storage medium includes, but is not limited to, a floppy disc, an optical disc, a magnetic optical disc, a memory card, a memory stick and the like.

In the foregoing description of specific embodiments, the features described and/or shown for an implementation mode may be used in one or more other implementation modes in the same or similar way, or combined with those in the other implementation modes, or replace those in the other implementation modes.

It should be emphasized that the terms "comprise/include", as used herein, refer to the presence of a feature, an element, a step or an assembly but do not preclude the presence or addition of one or more other features, elements, steps or assemblies.

In addition, the methods of the present embodiments are not limited to be implemented according to the time order described in the description, but may also be implemented sequentially, in parallel or independently according to other time orders. Thus, the implementation order of the methods described in the description is not construed as limiting the technical scope of the present embodiments.

While the present embodiments have been disclosed above with reference to descriptions of the specific embodiments, it should be understood that all of the aforementioned embodiments and examples are exemplary but not limiting. A variety of modifications, improvements or equivalents of the present embodiments can be devised by those skilled in the art within the spirit and scope of the appended claims. The modifications, improvements or equivalents should also be considered as being included in the scope of protection of the present embodiments.

According to an aspect of the present embodiments, a method for training a face recognition model comprises: removing black eyepits and sunglasses in first actual scenario data composed of an image containing a face which is acquired from an actual scenario, to obtain second actual scenario data; counting a proportion of wearing glasses in the second actual scenario data; dividing original training data composed of an image containing a face into wearing-glasses first training data and not-wearing-glasses second training data, wherein a proportion of wearing glasses in the original training data is lower than a proportion of wearing glasses in the second actual scenario data; generating wearing-glasses third training data based on glasses data and the second training data; generating fourth training data in which a proportion of wearing glasses is equal to the proportion of wearing glasses in the second actual scenario data, based on the third training data and the original training data; and training the face recognition model based on the fourth training data. The dividing comprises: detecting a position of the face in the original training data; aligning the face in the original training data with a standard face; judging, using a deep convolutional neural network or classifier, whether the aligned face in the original training data is wearing glasses, to divide the original training data into the first training data and the second training data. The glasses data comprises keypoint information, glasses images, and lens information of various types of glasses, the keypoint information representing a shape and a structure of the glasses, the lens information identifying a boundary between lenses and a frame. The generating wearing-glasses third training data based on the glasses data and the second training data comprises: randomly selecting a glasses type from existing glasses types; randomly changing a glasses image corresponding to the selected glasses type; recognizing keypoint information near eyes in the second training data; merging the image containing the face in the second training data with the randomly changed glasses image using affine transformation, based on keypoint information corresponding to the randomly changed glasses image and the recognized keypoint information near the eyes, to obtain the third training data. The randomly changing a glasses image corresponding to the selected glasses type comprises at least one of: randomly selecting a glasses frame of an existing type to substitute a glasses frame in the glasses image; randomly changing a thickness of the glasses frame; randomly changing a shape of the glasses frame; randomly changing a color of glasses lenses. In a case where the selected glasses type is near-sighted glasses, the merging comprises: determining the recognized merged area and lens area around the eyes using affine transformation, based on keypoint information and lens information corresponding to the randomly changed glasses image as well as the recognized keypoint information near the eyes; extracting, from the image containing the face in the second training data, an area in the image which is around the eyes and larger than the lens area, and zooming it to have a same size as the lens area, and superimposing a zooming result with the randomly changed glasses image, to obtain map data; substituting original data in the merged area with the map data. The original training data is acquired from Internet or collected manually.

According to another aspect of the present embodiments, an apparatus for training a face recognition model comprises: a removing device configured to: remove black eyepits and sunglasses in first actual scenario data composed of an image containing a face which is acquired from an actual scenario, to obtain second actual scenario data; a counting device configured to: count a proportion of wearing glasses in the second actual scenario data; a dividing device configured to: divide original training data composed of an image containing a face into wearing-glasses first training data and not-wearing-glasses second training data, wherein a proportion of wearing glasses in the original training data is lower than a proportion of wearing glasses in the second actual scenario data; an adding glasses device configured to: generate wearing-glasses third training data based on glasses data and the second training data; a proportion adjusting device configured to: generate fourth training data in which a proportion of wearing glasses is equal to the proportion of wearing glasses in the second actual scenario data, based on the third training data and the original training data; and a model training device configured to: train the face recognition model based on the fourth training data. The dividing device comprises: a detecting unit configured to: detect a position of the face in the original training data; an aligning unit configured to: align the face in the original training data with a standard face; a deep convolutional neural network or classifier for judging whether the aligned face in the original training data is wearing glasses, to divide the original training data into the first training data and the second training data. The glasses data comprises keypoint information, glasses images, and lens information of various types of glasses, the keypoint information representing a shape and a structure of the glasses, the lens information identifying a boundary between lenses and a frame. The adding glasses device comprises: a type selecting unit configured to randomly select a glasses type from existing glasses types; an image changing unit configured to randomly change a glasses image corresponding to the selected glasses type; a recognizing unit configured to recognize keypoint information near eyes in the second training data; a merging unit configured to merge the image containing the face in the second training data with the randomly changed glasses image using affine transformation, based on keypoint information corresponding to the randomly changed glasses image and the recognized keypoint information near the eyes, to obtain the third training data. The image changing unit is further configured to perform at least one of the operations of: randomly selecting a glasses frame of an existing type to substitute a glasses frame in the glasses image; randomly changing a thickness of the glasses frame; randomly changing a shape of the glasses frame; randomly changing a color of glasses lenses. In a case where the selected glasses type is near-sighted glasses, the merging unit is further configured to: determine the recognized merged area and lens area around the eyes using affine transformation, based on keypoint information and lens information corresponding to the randomly changed glasses image as well as the recognized keypoint information near the eyes; extract, from the image containing the face in the second training data, an area in the image which is around the eyes and larger than the lens area, and zoom it to have a same size as the lens area, and superimpose a zooming result with the randomly changed glasses image, to obtain map data; substitute original data in the merged area with the map data. The original training data is acquired from Internet or collected manually.

According to yet another aspect of the present embodiments, a computer-readable storage medium stores thereon a program that, when executed by an information processing apparatus, causes the information processing apparatus to execute the operations of: removing black eyepits and sunglasses in first actual scenario data composed of an image containing a face which is acquired from an actual scenario, to obtain second actual scenario data; counting a proportion of wearing glasses in the second actual scenario data; dividing original training data composed of an image containing a face into wearing-glasses first training data and not-wearing-glasses second training data, wherein a proportion of wearing glasses in the original training data is lower than a proportion of wearing glasses in the second actual scenario data; generating wearing-glasses third training data based on glasses data and the second training data; generating fourth training data in which a proportion of wearing glasses is equal to the proportion of wearing glasses in the second actual scenario data, based on the third training data and the original training data; and training the face recognition model based on the fourth training data.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A method for training a face recognition model, comprising:
removing black eyepits and sunglasses in first actual scenario data composed of an image containing a face which is acquired from an actual scenario, to obtain second actual scenario data;
counting a proportion wearing glasses in the second actual scenario data;
dividing original training data composed of an image containing the face into wearing-glasses first training data and not-wearing-glasses second training data, where a proportion of wearing glasses in the original training data is lower than a proportion of wearing glasses in the second actual scenario data;
generating wearing-glasses third training data based on glasses data and the second training data;
generating fourth training data in which a proportion wearing glasses is equal to the proportion of wearing glasses in the second actual scenario data, based on the third training data and the original training data; and
training the face recognition model based on the fourth training data.

2. The method according to claim 1, wherein the dividing comprises:
detecting a position of the face in the original training data;
aligning the face in the original training data with a standard face;
judging, using one of a deep convolutional neural network and a classifier, whether an aligned face in the original training data is wearing glasses, to divide the original training data into the first training data and the second training data.

3. The method according to claim 1, wherein the glasses data comprises keypoint information, glasses images, and lens information of various types of glasses, the keypoint information representing a shape and a structure of the glasses, the lens information identifying a boundary between lenses and a frame.

4. The method according to claim 3, wherein the generating wearing-glasses third training data based on the glasses data and the second training data comprises:
randomly selecting a glasses type from existing glasses types;
randomly changing a glasses image corresponding to the selected glasses type;
recognizing keypoint information near eyes in the second training data;
merging the image containing the face in the second training data with a randomly changed glasses image using an affine transformation, based on keypoint information corresponding to the randomly changed glasses image and recognized keypoint information near the eyes, to obtain the third training data.

5. The method according to claim 4, wherein the randomly changing a glasses image corresponding to the selected glasses type comprises at least one of:
randomly selecting a glasses frame of an existing type to substitute a glasses frame in the glasses image;
randomly changing a thickness of the glasses frame;
randomly changing a shape of the glasses frame; and
randomly changing a color of glasses lenses.

6. The method according to claim 4, wherein when the selected glasses type is near-sighted glasses, the merging comprises:
determining the recognized merged area and lens area around the eyes using an affine transformation, based on keypoint information and lens information corresponding to the randomly changed glasses image as well as the recognized keypoint information near the eyes;
extracting, from the image containing the face in the second training data, an area in the image which is around the eyes and larger than the lens area, and zooming the area to have a same size as the lens area, and superimposing a zooming result with the randomly changed glasses image, to obtain map data;
substituting original data in the merged area with the map data.

7. The method according to claim 1, wherein the original training data is acquired from one of an Internet and collected manually.

8. An apparatus for training a face recognition model, comprising:
a memory, and
a processor coupled to the memory and the processor is to:
remove black eyepits and sunglasses in first actual scenario data composed of an image containing a face which is acquired from an actual scenario, to obtain second actual scenario data;
count a proportion wearing glasses in the second actual scenario data;
divide original training data composed of an image containing a face into wearing-glasses first training data and not-wearing-glasses second training data, where the proportion of wearing glasses in the original training data is lower than the proportion of wearing glasses in the second actual scenario data;
generate wearing-glasses third training data based on glasses data and the second training data;
generate fourth training data in which the proportion of wearing glasses is equal to the proportion of wearing glasses in the second actual scenario data, based on the third training data and the original training data; and
train the face recognition model based on the fourth training data.

9. The apparatus according to claim 8, wherein the processor is further to:
detect a position of the face in the original training data;
align the face in the original training data with a standard face;
judge whether the aligned face in the original training data is wearing glasses, to divide the original training data into the first training data and the second training data.

10. The apparatus according to claim 8, wherein the glasses data comprises keypoint information, glasses images, and lens information of various types of glasses, the keypoint information representing a shape and a structure of the glasses, the lens information identifying a boundary between lenses and a frame.

11. The apparatus according to claim 10, wherein the processor is further to:
randomly select a glasses type from existing glasses types;
randomly change a glasses image corresponding to a selected glasses type;
recognize keypoint information near eyes in the second training data;
merge the image containing the face in the second training data with randomly changed glasses image using an affine transformation, based on the keypoint information corresponding to the randomly changed glasses image and the recognized keypoint information near the eyes, to obtain the third training data.

12. The apparatus according to claim 11, wherein the processor is further to:
randomly select a glasses frame of an existing type to substitute a glasses frame in the glasses image;
randomly change a thickness of the glasses frame;
randomly change a shape of the glasses frame;
randomly change a color of glasses lenses.

13. The apparatus according to claim 11, wherein when the selected glasses type is near-sighted glasses, the processor is further to:
determine a recognized merged area and lens area around the eyes using an affine transformation, based on keypoint information and lens information corresponding to the randomly changed glasses image as well as recognized keypoint information near the eyes;
extract, from the image containing the face in the second training data, an area in the image which is around the eyes and larger than the lens area, and zoom the area to have a same size as the lens area, and superimpose a zooming result with the randomly changed glasses image, to obtain map data;
substitute original data in the merged area with the map data.

14. The apparatus according to claim 8, wherein the original training data is acquired from one of an Internet and collected manually.

15. A non-transitory computer-readable storage medium storing thereon a program that, when executed by an information processing apparatus, causes the information processing apparatus to execute the operations of:

removing black eyepits and sunglasses in first actual scenario data composed of an image containing a face which is acquired from an actual scenario, to obtain second actual scenario data;

counting a proportion of wearing glasses in the second actual scenario data;

dividing original training data composed of an image containing a face into wearing-glasses first training data and not-wearing-glasses second training data, where the proportion of wearing glasses in the original training data is lower than the proportion of wearing glasses in the second actual scenario data;

generating wearing-glasses third training data based on glasses data and the second training data;

generating fourth training data in which a proportion of wearing glasses is equal to the proportion of wearing glasses in the second actual scenario data, based on the third training data and the original training data; and     training the face recognition model based on the fourth training data.

* * * * *